United States Patent [19]

Marchetti

[11] 4,262,468
[45] Apr. 21, 1981

[54] DEVICE FOR SPACING APART OBJECTS CONVEYED THROUGH AN OPERATION-PERFORMING MACHINE

[76] Inventor: Augusto Marchetti, Piazza Sicilia 7, Milan, Italy

[21] Appl. No.: 970,066

[22] Filed: Dec. 15, 1978

[30] Foreign Application Priority Data

Feb. 17, 1978 [IT] Italy ................................ 20373 A/78

[51] Int. Cl.² .......................... B65B 57/04; B65B 7/20
[52] U.S. Cl. .......................................... 53/67; 53/374; 198/491
[58] Field of Search ................... 53/374, 250, 249, 67, 53/69, 70, 71; 198/491

[56] References Cited

U.S. PATENT DOCUMENTS

| 3,462,823 | 8/1969 | Heisler | 198/491 X |
| 3,627,106 | 12/1971 | Winfield | 198/491 X |

Primary Examiner—Travis S. McGehee
Attorney, Agent, or Firm—Karl W. Flocks

[57] ABSTRACT

This invention relates to a device for spacing apart objects conveyed through an operation-performing machine provided with operating-performing means arranged in a predetermined operating zone along an object support surface. The device according to the invention comprises a pair of transverse pushers, which are disposed at the two sides of said support surface upstream of said operating zone and can be displaced from a rest position to a working position in which they are able to engage with opposite sides of the objects. Said pushers are suitably controlled by means sensitive to the position of the objects along said support surface.

1 Claim, 7 Drawing Figures

DEVICE FOR SPACING APART OBJECTS CONVEYED THROUGH AN OPERATION-PERFORMING MACHINE

This invention relates to a device for spacing apart objects conveyed through an operation-performing machine.

Various operation-performing machines are known, comprising a surface on which the conveyed objects are supported and fed, and operation-performing means located along said surface to operate on said objects as they pass through a predetermined operating zone of the machine.

Machines of this kind comprise for example the known machines for closing and possibly sealing parallelepiped packaging boxes, the operation-performing means of which consist of suitable members for closing the upper flaps, and possibly a terminal taping head.

In such operation-performing machines it is notably important for the conveyed objects to traverse the operating zone of the machine sufficiently spaced apart to enable the various operation-performing means to operate on one object at a time, without interference by the previous or subsequent one.

This is particularly the case with the closing members for the front and rear flaps in the aforesaid machines for closing packaging boxes, these members having obvious need for space in which to close the flaps as they become engaged with them.

On the other hand, it is frequently found that the objects arrive at the operation-performing machine strictly adjacent to each other, and therefore need to be adequately spaced apart.

The object of the present invention is to provide a device to automatically provide a suitable spacing between objects at the inlet of an operation-performing machine of the aforesaid general type, or at least upstream of the predetermined operating zone thereof.

According to the invention this object is attained by a device for association with an operation-performing machine provided with a surface for supporting and feeding the objects, and with operation-performing means located along said surface for operating on said objects as they pass through a predetermined operating zone of the machine, the device comprising a pair of transverse pushers disposed to the two sides of said support surface upstream of said predetermined zone and operable on command from a withdrawn rest position to an extended working position in which they are able to engage with opposing sides of an object disposed between them to prevent its further forward movement, means being provided sensitive to the position of the objects along said support surface, which are operationally connected to said transverse pushers and disposed in such a manner as to control the movement of the pushers into their extended position for the momentary stoppage of a second object before a first object has entered said predetermined zone, and the return of said pushers into their withdrawn position for releasing said second object after said first object has left said predetermined zone.

It is apparent that by suitably controlling the operation of the two pushers, the feed of the next conveyed object can be held up while the first is undergoing operation in the operating zone of the machine, so that there is no interference between the operation-performing means acting on the first object and the next object, for any initial distance, including zero, between one object and another.

This is obtained, inter alia, by simple means of easy construction and operation, which, at least when associated with known machines for closing parallelepiped packaging boxes, preferably take the form of pneumatic cylinders with pusher heads, which are supported by respective divaricable portions of a pair of belt conveyor units for conveying the boxes, resilient means acting on said divaricable portions to yieldably urge them towards a state of alignment with remaining portions of said conveyor units.

Said preferred embodiment of the device according to the invention is illustrated for greater clarity, by way of non-limiting example, in the accompanying drawings in which.

Figure 1:
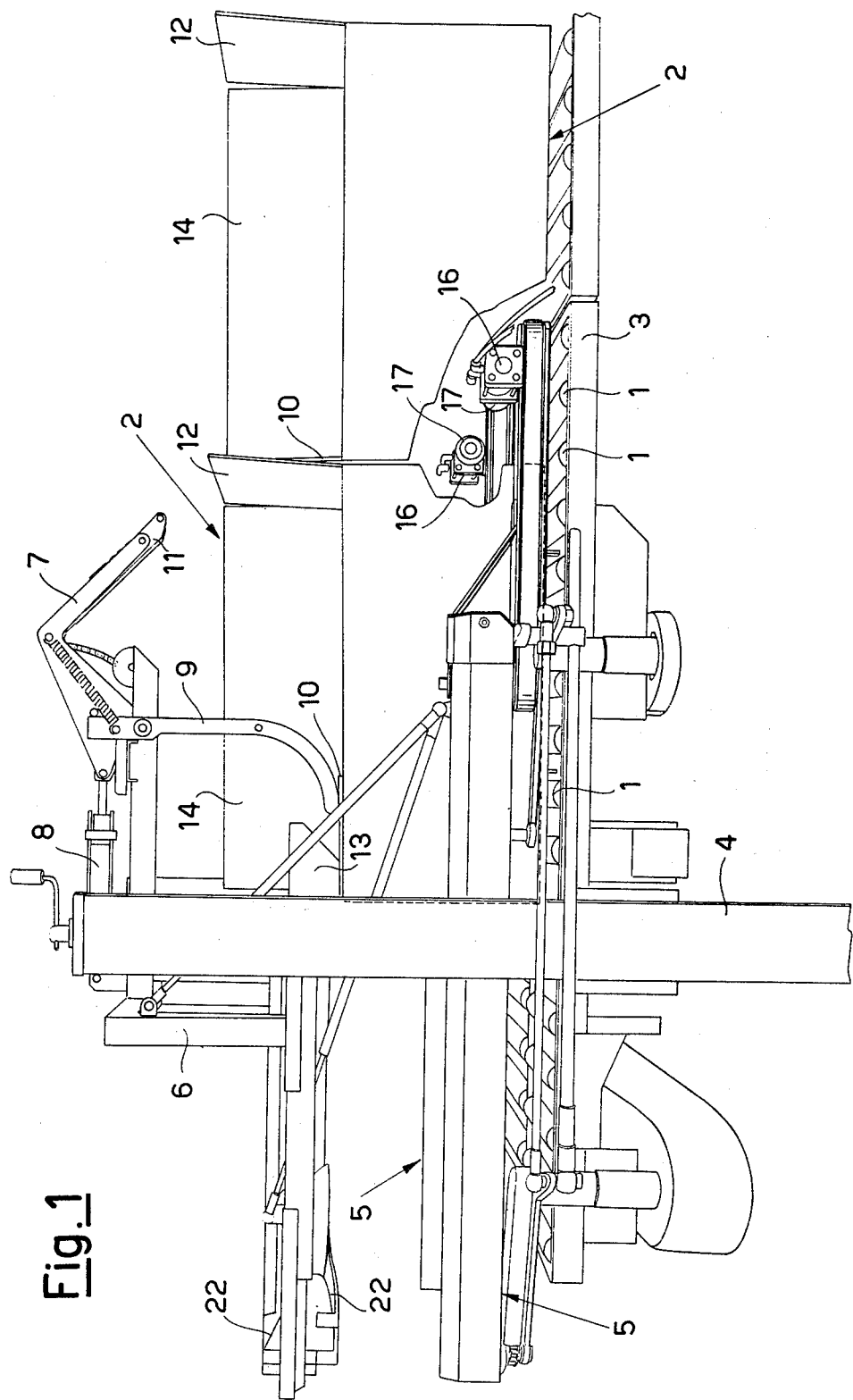
FIGS. 1 and 2 are side views, in successive stages of operation, of a machine for closing the upper flaps of parallelepiped packaging boxes, incorporating a spacing device according to the present invention.

The machine shown on the drawings is a machine for closing the upper flaps of parallelepiped boxes, described in greater detail in a copending U.S. patent application Ser. No. 6,133 Jan. 24, 1979, by the same inventor and comprising a rectangular frame 3 which rotatably supports a succession of rollers 1 defining a surface for supporting and feeding boxes 2 fed one behind the other with their upper flaps in the open position, a pair of lateral support uprights 4 for said frame 3, a pair of belt conveyor units 5 arranged to engage with the sides of the boxes 2 for conveying then continuously from one end (right) to the other end (left) of said support surface, a bridge frame 6 supported at an adjustable height by the uprights 4, and supporting a rotatable support 7 (operated by a cylinder 8) for a member 9 for closing the front flap 10 and a member 11 for closing the rear flap 12, a central stationary guide 13 which replaces said closure members 9 and 11 to keep the two end flaps 10 and 12 closed after they have been released by said closure members, and a pair of lateral stationary guides 22 shaped to cause the lateral flaps 14 to close when engaged thereby.

Figure 3:
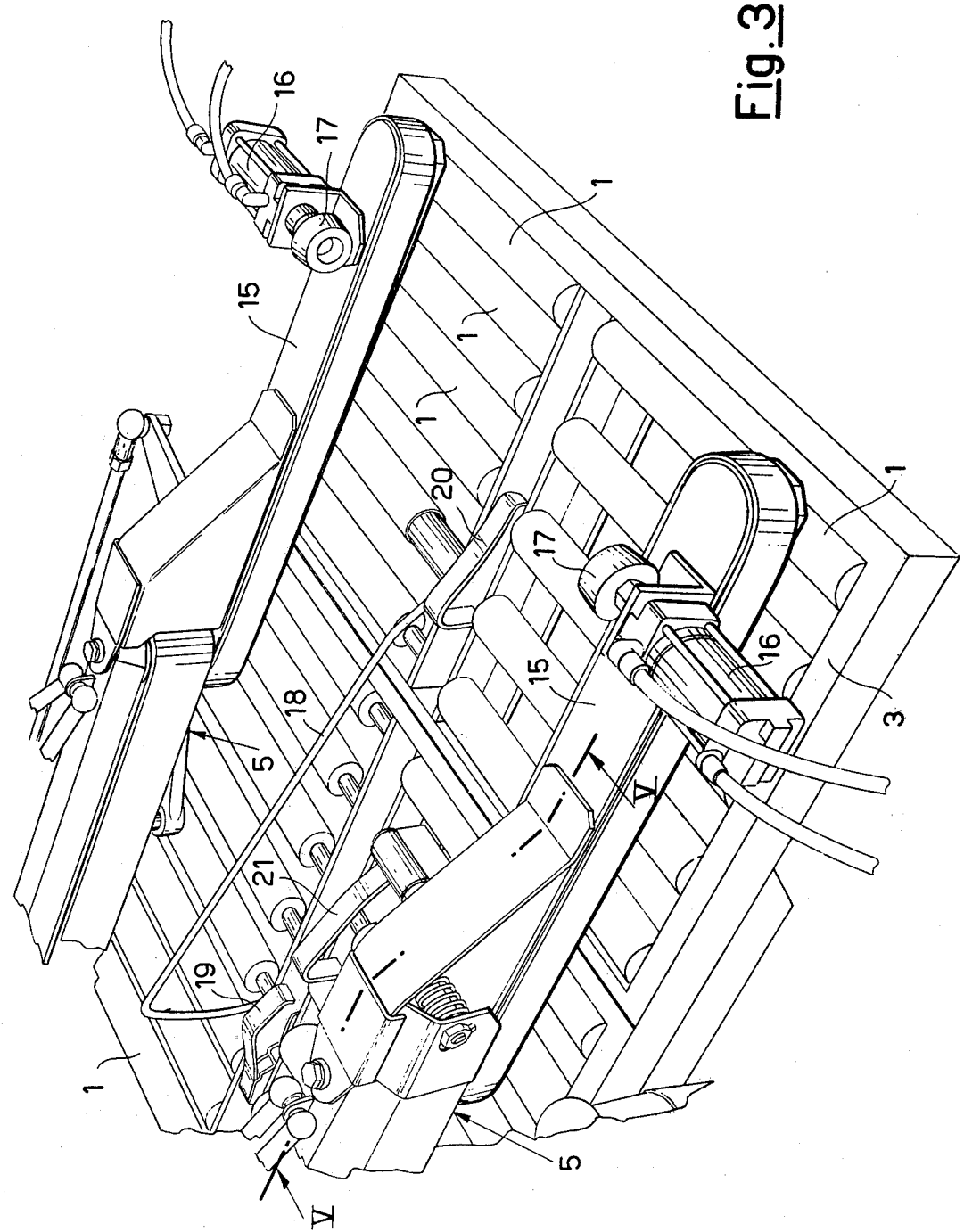
FIG. 3 is an enlarged detailed view of the group of members constituting said spacing device, in the rest position.
Figure 6:
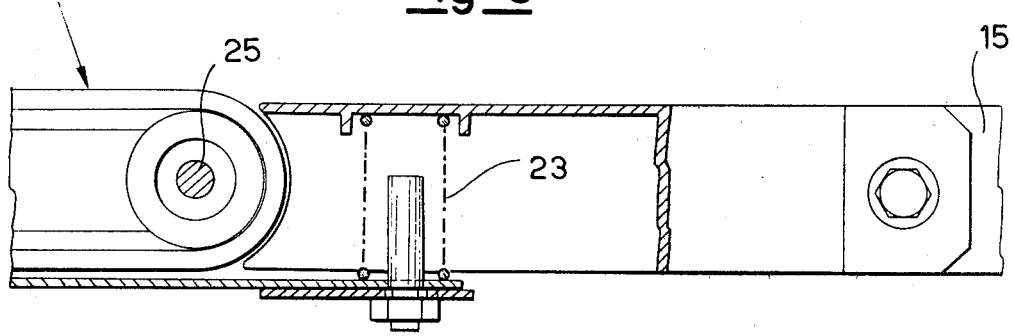
FIG. 6 is a horizontal section through said articulation region on the line VI—VI of FIG. 5.

According to the present invention, upstream of the operating zone in which the closure members 9 and 11 operate, the two conveyor units 5 comprise respective divaricable portions 15 with articulated joints 25, which are urged by springs 23 towards the aligned position in FIGS. 3 and 6.

Each of said divaricable portions 15 supports a respective pneumatic cylinder 16, of which the rubber-faced pusher head 17 constitutes one of two transverse pushers designed to be moved from a withdrawn rest position (FIG. 3) into an extended working position (FIG. 4) in which they are able to engage the sides of any box 2 disposed therebetween, to prevent its further feed.

The cylinders 16 are operated by a compressed air unit of simple type obvious to an expert of the art, which is connected to two sensors 18 and 19 located on the support surface 1 (FIG. 3) so that they become engaged in succession by the base of the fed boxes. Engagement with the sensor 19 subsequent to engagement with the sensor 18 causes the cylinders 16 to be moved into the extended position of FIG. 4, whereas disengagement from the sensor 18 causes the cylinders 16 to return to rest. The position of the sensors 18 and 19 is chosen according to the length of the boxes 2 and the position of two further sensors 20 and 21 which control the beginning and end of operation of the cylinder 8 for rotating the rotatable support 7 and the consequent operation of the rear closure member 11 as described and illustrated in the aforesaid copending patent application, i.e. disengagement from the sensor 20 causes the closure member 11 to operate (FIG. 2) and disengagement from the sensor 21 causes it to return to rest. More precisely, the position of the sensors 18 and 19 is chosen in such a manner that engagement with the sensor 19 causes the cylinders 16 to operate in order to halt any second box which may be arriving (FIGS. 2 and 4) before the previous box disengages from the sensor 20 to initiate the operation of the rear closure member 11, and disengagement from the sensor 18 causes the cylinders 16 to return to rest to release the halted box after the previous box has disengaged from the sensor 21 on leaving the operating zone below the mobile closure members 9 and 11 (defined by the sensors 20 and 21), and causes the rear closure member 11 to return to rest (FIG. 1). The distance between the sensors 19 and 20 must be less than the length of the boxes, and the sensor 18 must be able to be disengaged after disengagement from the sensor 21.

Figure 2:
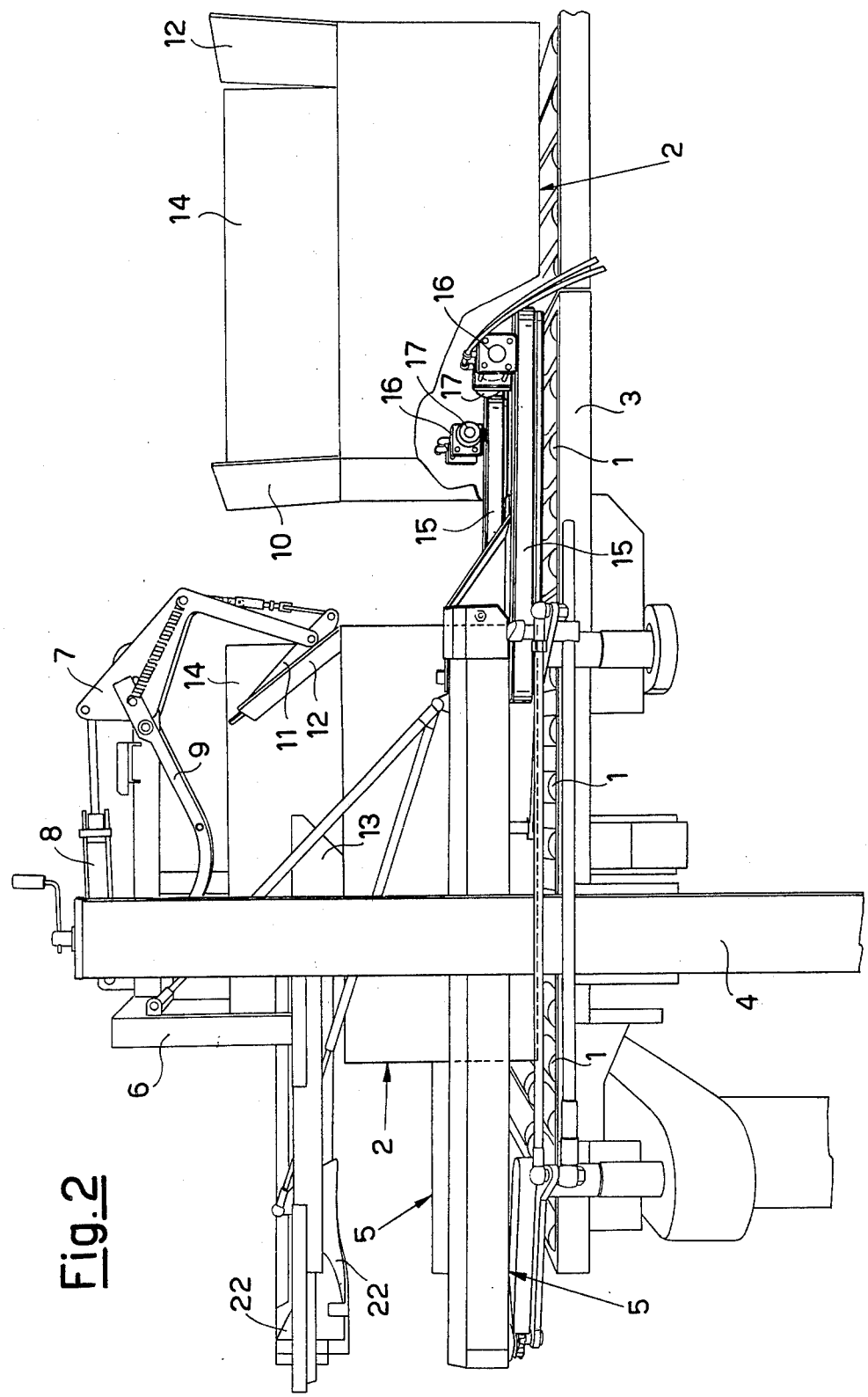
Figure 4:
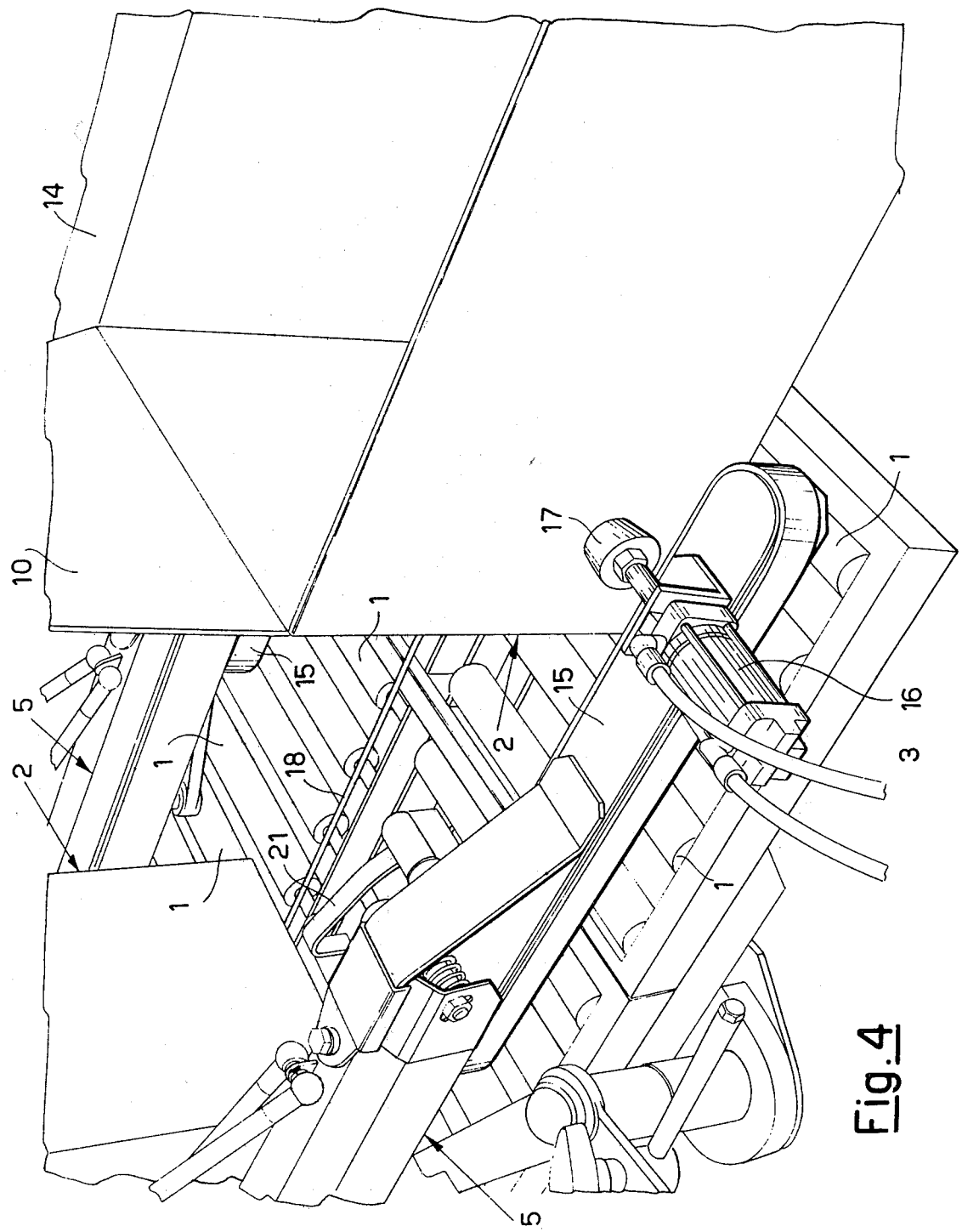
FIG. 4 is an enlarged detailed view of the same group of members when operating on a box undergoing spacing.
Figure 5:
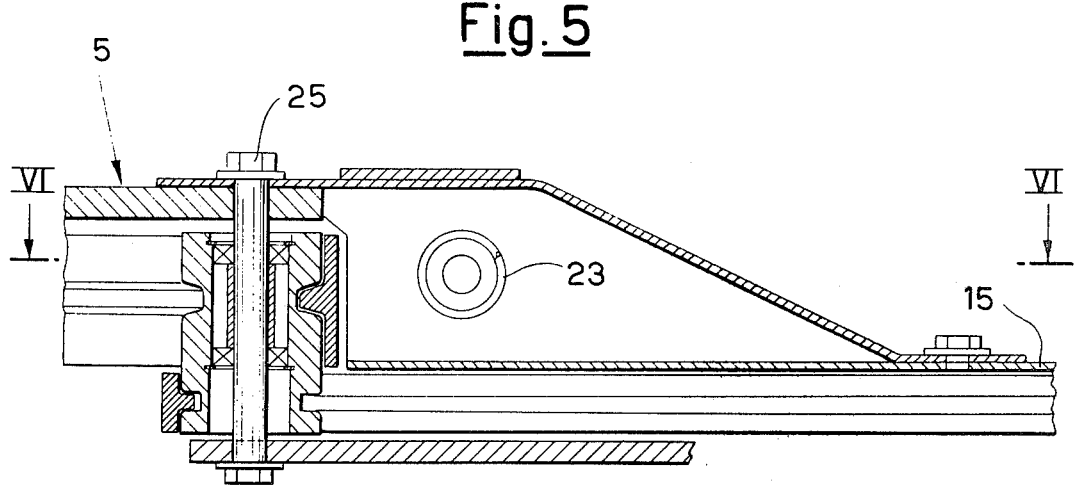
FIG. 5 is an enlarged detailed longitudinal vertical section on the line V—V of FIG. 3, through the articulation region of a divaricable portion supporting a respective pusher, of one of the two belt conveyor units with which the machine is provided.
Figure 7:
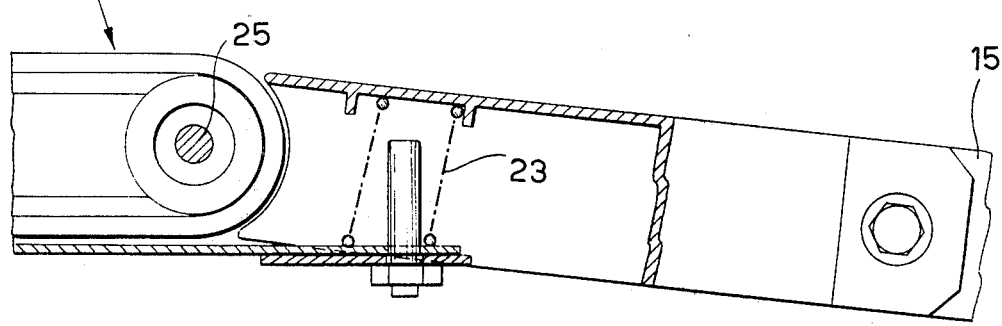
FIG. 7 is a sectional view of said articulation region as in FIG. 6, but with the articulated joint in the position of FIG. 4.

The spacing device associated with the machine shown on the drawings is intended to operate in the following manner. It will be assumed that two boxes 2 are fed on to the roller surface 1 (from a previous conveyor) strictly adjacent to each other as shown in FIG. 1, the base of the first box engaging in succession with the sensors 20, 18, 21 and 19, the front flap 10 in the meantime being closed by the front closure member 9 and then kept closed by the central stationary guide 13. When the base of the first box comes into engagement with the last sensor 19, this base has as yet not disengaged from the first sensor 20, and the second box is consequently still behind this latter sensor (FIG. 1). Engagement with the sensor 19 causes the pushers 17 to be moved into the extended position, by which they engage with the sides of the second box to momentarily halt it, and, by reaction against the cylinders 16, they force the divaricable portions 15 of the conveyor units 5 to take a divaricated position as shown in FIGS. 4 and 7, overcoming the opposing action of the springs 23.

While the second box is thus halted, the first box continues on its path, firstly leaving the sensor 20, thus causing the rear closure member 11 to operate, then leaving the sensor 21, thus causing the closure members 9 and 11 with the relative rotatable support 7 to return to rest, and finally engaging with the fixed guides 13 and 22 to keep the end flaps 10 and 12 closed, and to close the side flaps 14 respectively.

When the base of the first box disengages from the sensor 18, the cylinders 16 return the pusher heads 17 to rest, and the reaction due to this also causes the divaricable portions 15 of the conveyor units 5 to return to rest. As said divaricable portions return to the aligned position of FIGS. 3 and 6, the second box is released and proceeds through the operating zone defined by the sensors 20 and 21. Any third box will then if necessary be momentarily halted by the pushers 17 for spacing it apart from the second box.

What I claim is:
1. A device for spacing apart objects conveyed through an operation-performing machine comprising
   a surface for supporting and feeding the objects including a predetermined zone,
   operation-performing means located along said surface for operating on the objects as they pass through said predetermined zone,
   a pair of transverse pushers disposed along two sides of said support surface, upstream of said predetermined zone and operable on command from a withdrawn rest position to an extended working position in which they are able to engage with opposing sides of an object disposed between them to prevent its further forward movement,
   means sensitive to the position of the objects along said support surface, operationally connected to said transverse pushers and disposed in such a manner as to control the movement of said pushers into their extended position for the momentary stoppage of a second object before a first object has entered said predetermined zone, and the return of said pushers into their withdrawn position for releasing said second object after the first object has left said predetermined zone,
   said pushers including
   pusher heads,
   a pneumatic cylinder connected to each of said pusher heads,
   divaricable portions of belt conveyor units supporting said cylinders and engageable with the sides of the objects for conveying the objects,
   resilient means acting on said divaricable portions to yieldably urge them towards a state of alignment with each other.

* * * * *